Oct. 7, 1941.   M. E. MARTELLOTTI   2,257,849
MACHINE TOOL TEMPERATURE CONTROL
Filed March 20, 1940   2 Sheets-Sheet 2

INVENTOR.
MARIO E. MARTELLOTTI
BY
AHK Parsons
ATTORNEY.

Patented Oct. 7, 1941

2,257,849

UNITED STATES PATENT OFFICE 2,257,849

MACHINE TOOL TEMPERATURE CONTROL

Mario E. Martellotti, Cincinnati, Ohio, assignor to The Cincinnati Milling Machine Co., Cincinnati, Ohio, a corporation of Ohio Application March 20, 1940, Serial No. 324,985

11 Claims. (Cl. 90—11)

This invention relates to machine tools and more particularly to improved temperature control means therefor.

Recent improvements in cutting tools have increased their efficiency and in order that maximum results may be obtained from these tools it is necessary that they be rotated at speeds relatively higher than those required in the past. In machine tools utilizing rotary cutters, such as milling machines, provision must now be made for tool spindle speeds that are substantially double of what they were formerly.

This has affected the design of the variable speed transmission for driving such spindles, necessitating general increases in the rate of rotation of the component parts of such transmission with the result that more heat is generated in the machine and to such an extent that it can affect the accuracy of the machine due to uncompensable expansion of the parts connecting the work support and tool support.

One of the objects of this invention is to provide means for controlling the heat generated or, in other words, minimizing the temperature rise in a machine tool sufficiently to prevent expansive disturbances that are detrimental to the accuracy of the machine.

Another object of this invention is to provide an improved cooling system which is effective internally as well as externally of the machine.

A further object of this invention is to devise a new and improved flow circuit for a cooling medium and to provide improved means for impelling the flow in said circuit.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 1:
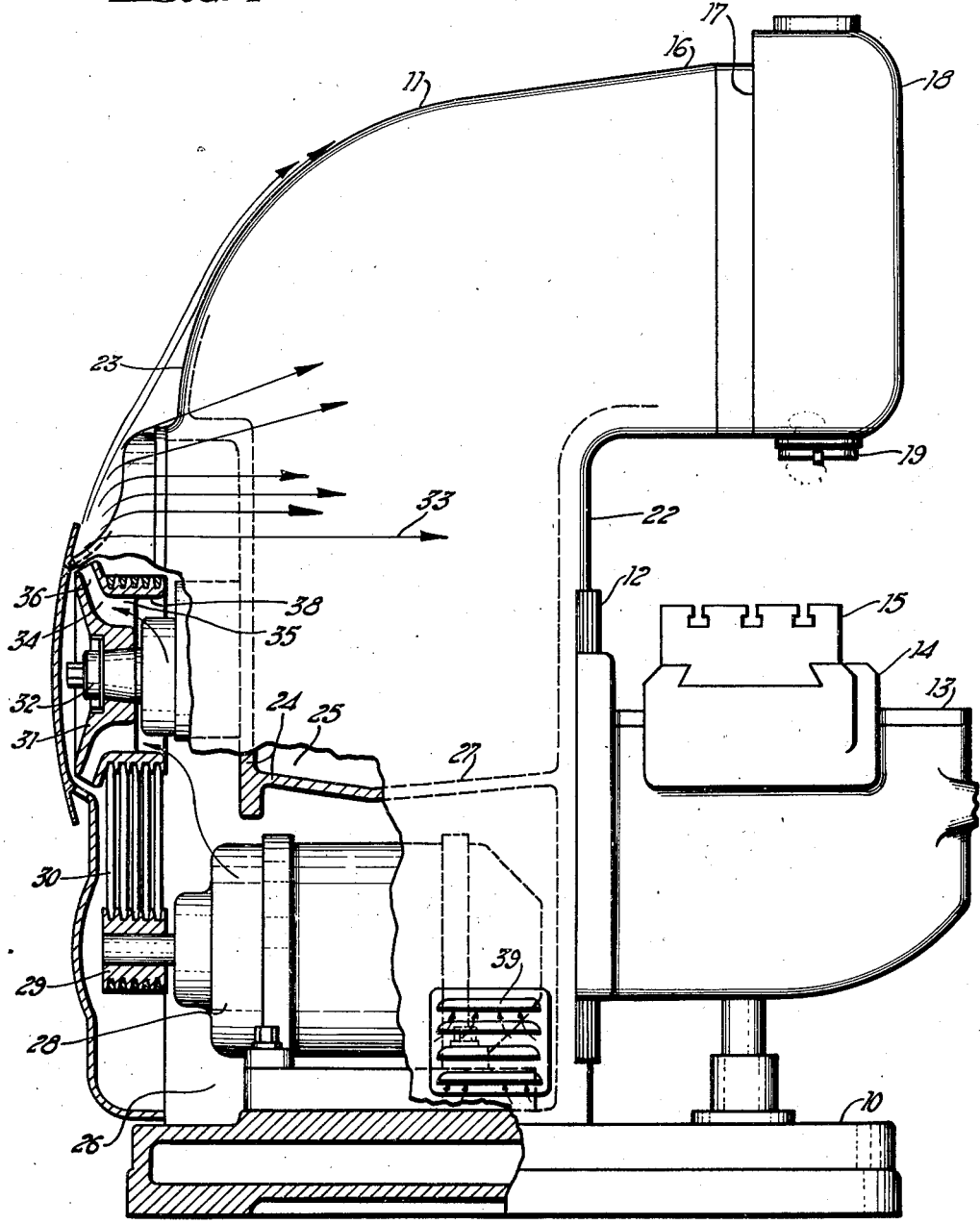
Figure 1 is a side elevation of a machine tool embodying the principles of this invention.
Figure 2:
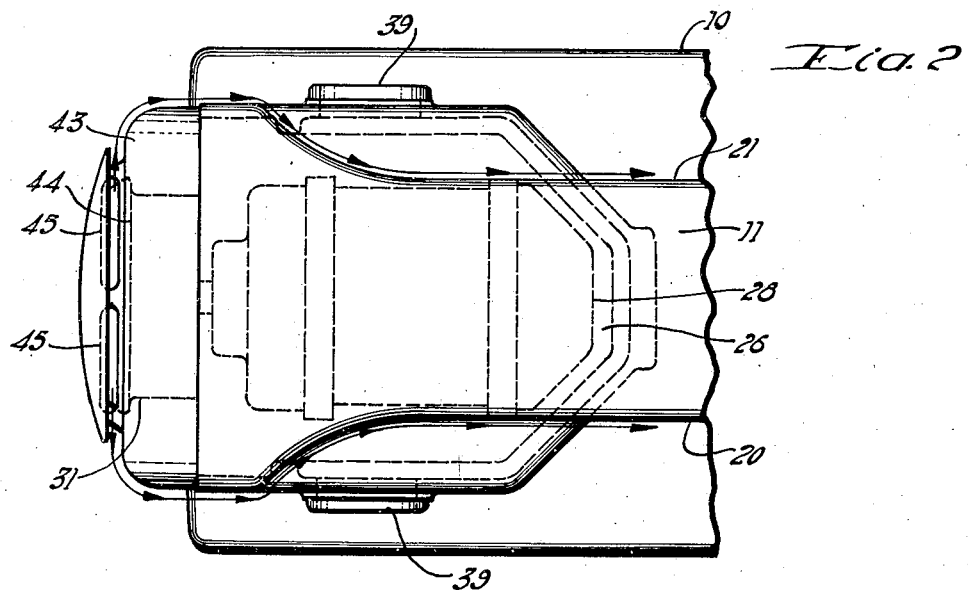
Figure 2 is a partial plan view of the machine shown in Figure 1.

In Figure 1 of the drawings there is shown a machine tool embodying the principles of this invention consisting of a vertical milling machine of the knee and column type. This machine has a base or pedestal 10, from which uprises a column, indicated generally by the reference numeral 11, having vertical guideways 12 upon the front wall for guiding a knee 13 which, in turn, carries a saddle 14 upon which a work support or table 15 is slidably mounted.

The knee, saddle and table constitute the work supporting structure. The column has a goose-necked portion 16 upon the end of which is a guide surface 17 for the spindle carrier 18 which is usually adjustable toward and from the work support. A tool spindle 19 is journaled in the spindle carrier for effecting rotation of a cutting tool.

In horizontal cross section the column is a hollow box-like structure having two side walls 20 and 21, and front and rear walls 22 and 23. The upper portion of the interior of the column is separated by a partition 24 from the lower interior of the column thereby dividing the column into a transmission chamber 25 and a motor chamber 26.

The transmission chamber is utilized for housing the variable speed transmission for the tool spindle, as well as a variable speed transmission for the work support. The floor 24 of the transmission chamber, in conjunction with the side walls of the column, serves to form a reservoir for a lubricant for the various transmission parts which is usually circulated from the reservoir to the transmission parts by suitable known pumping means.

A high speed transmission mounted in the transmission chamber will generate considerable heat and this heat will be transmitted from the various bearings to the walls of the column and mostly through metallic paths which are efficient heat conductors.

In addition, the lubricant flowing over the various working parts absorbs heat which is carried to the body of lubricant in the reservoir, thereby raising the temperature of the bottom and side walls of the reservoir. A motor 28, of sufficient horsepower for actuating the entire machine, is mounted in the motor chamber 26. The drive pulley 29 of this motor is connected by multiple V-belts 30 to a drive pulley 31 mounted on the end of a shaft 32, which shaft is adapted to extend into the transmission chamber for actuating the transmissions for the tool spindle and work support. An enclosed motor generates considerable heat which will be absorbed by the walls of the column, and since heat has a tendency to rise, this heat will also be absorbed by the partition 24 which lies between the motor chamber and the transmission chamber. It will be evident that if heat is generated in the machine faster than it is dissipated by natural radiation that there will be a gradual accumulation of heat in the machine, resulting in a temperature rise of the material forming the side and end walls of the column and if this rise is excessive, expansion must take place. An accumulation of heat through the middle portion of the column in the region of the arrowed line 33 indicated in Figure 1, will produce vertical elongation of the column which will produce a disturbance in the distance between the end of the tool spindle and the top of the table 15, affecting the accuracy of work being produced.

It is, therefore, important that the temperature of the column and especially that part of the column which forms the connecting link between the work support and the cutter support and which establishes the distance between the two supports should not rise to a point that will cause any appreciable expansion if the accuracy of the machine is to be maintained.

A temperature control system has, therefore, been devised which acts internally as well as externally on the machine to absorb heat and dissipate it in the atmosphere.

An instrumentality has been provided for producing an artificial flow of cooling medium comprising a fan which is built-in to the pulley 31. As shown in Figure 1, the pulley is provided with a series of oblique angular passageways, indicated generally by the reference numeral 34, one portion 35 of which lies parallel to the axis of shaft 32, and the other portion 36 making an oblique angle to the portion 35. The passageways are separated by a series of partitions or webs 37 which serve as spokes for supporting the rim 38 of the pulley in which the V-grooves are formed for receiving the multiple V-belts 30, and as blades of a fan.

Upon rotation of the pulley, the air in the angular legs 36 of the passageways, is moved radially by centrifugal force and expelled to the atmosphere, thus creating a vacuum in the horizontal legs 35 which causes air to be drawn from the motor chamber 26. In this manner an artificial flow of cooling medium is created through the motor chamber, outside air entering the motor chamber through louvers 39 located in the opposing walls of the motor chamber as shown in Figures 1 and 3, flowing around and over the motor 28 to control the temperature thereof and then being expelled through the passageways in the pulley.

The volumetric rate of flow is made sufficiently high that the rise in temperature per cubic foot of air is relatively small because the path of this stream of air eventually carries it past the adjacent sides of the column to absorb more heat, and therefore in order to maintain an efficient temperature differential between the temperature of the air and the temperature of the column walls the heat absorption per cubic foot in the motor chamber must be kept relatively small.

Figure 3:
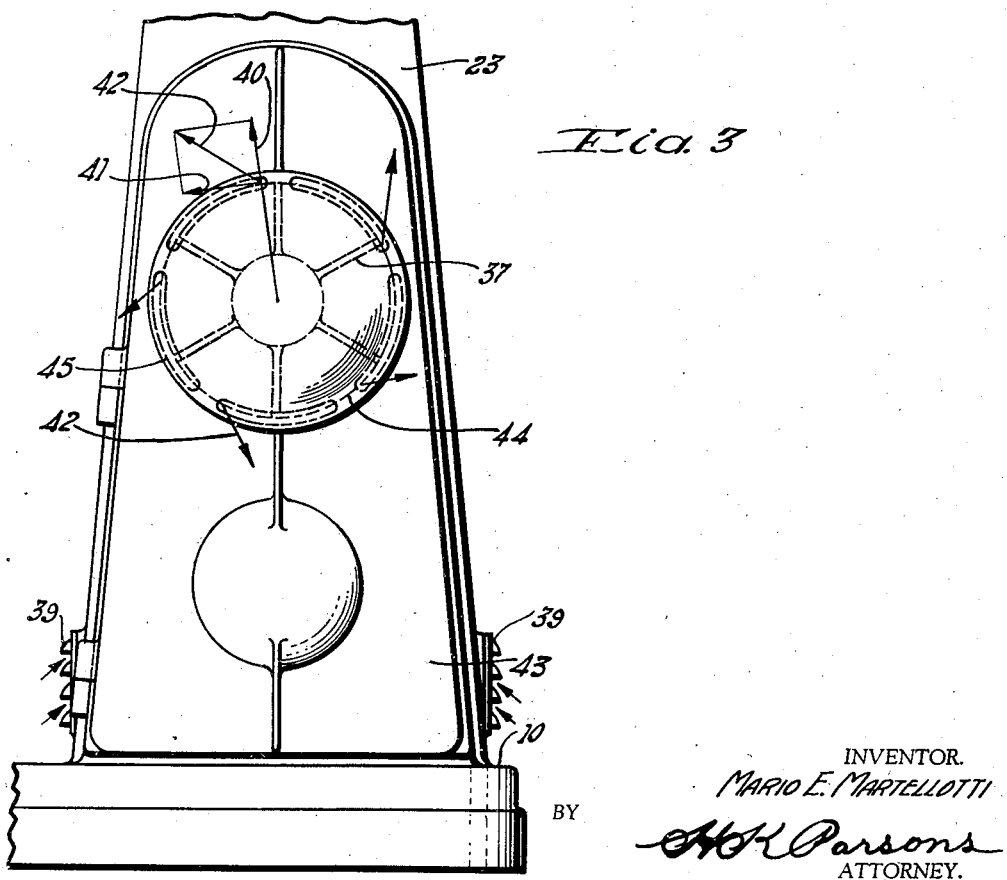
Figure 3 is a partial end elevation of the machine shown in Figure 1.

The cooling medium as it is expelled by the fan has a radial component of movement indicated by the arrow 40 in Figure 3 and a tangential component 41 which is dependent upon the rate of rotation of the flywheel which thus produces a resultant component 42 which indicates the direction and velocity of the air expelled by the fan, it being noted that the component 42, if extended, becomes a chord of the circle constituting the circumference of the fan. The cover plate 43 has a raised boss or turret 44 around the periphery of which is formed a plurality of openings 45 which, as shown in Figure 1, directs the air flow in a chordal path adjacent and parallel to the surface of the cover.

By means of this construction, that is, providing openings for discharge of air parallel to and adjacent a flat surface, advantage can be taken of what is known as "airfoil effect" which arises when a stream of air flows parallel to a surface. In other words, a stream of air flowing parallel and adjacent to a surface tends to create a vacuum between itself and the surface, and the external atmospheric pressure acting on the side of the stream opposite to the surface tends to force the stream against the surface and thereby maintain it adjacent thereto.

Once this effect is established it continues to function at the end of the surface and by proper formation of the adjacent surfaces this effect can be utilized to bend the stream of air around the corners of the rear of the machine and thus produce a flow parallel to the exterior of the side walls of the machine. Since the stream of air flows adjacent to said walls it will absorb heat therefrom and thus control their temperature. Thus, there emanates from around the periphery of the fan a series of chordal streams of air flowing outwardly in all directions, and by means of air foil effect these streams are bent and caused to flow over the top and along the sides of the machine, thus encompassing the machine in a surrounding layer of air which moves continuously from the back to the front of the machine. It will be noted from Figure 1 that some of this flow is adjacent that portion of the column which forms the connecting link between the work support and the tool support, thus controlling the temperature thereof and maintaining it at a point that will prevent disturbing expansion thereof.

There has now been provided an improved circulation system for controlling the temperature of a machine tool in which circulation of a cooling medium is created within the machine, after which the medium is expelled in a manner to take advantage of airfoil effect whereby the medium is caused to follow the exterior contours of the machine to control the temperature thereof. By means of this system, it will be evident that it is possible to apply a temperature controlling influence on all the exposed wall portions of the machine, some of which it would otherwise be difficult to reach.

What is claimed is:

1. In a machine tool having a work support, a tool support, a structural member including a series of walls for interconnecting and supporting said supports in fixed cooperative relation, the combination of a turret head projecting from one of said walls and having peripheral slots formed therein, a fan mounted for rotation under said turret head and means for rotating said fan to effect expulsion of air through said slots in parallel adjacent relation to the exterior of said walls for controlling the temperature thereof.

2. In a milling machine of the knee and column type having a tool spindle, a column for supporting the spindle in definite relation to the knee, said column including enclosing walls and a plurality of chambers formed therein for housing transmission mechanism, the combination of means for controlling the temperature of the column walls including a turret head formed on one of said walls and having peripheral openings therein, a fan supported for rotation under said turret head, said fan communicating with one of said chambers and effective for drawing air therefrom and discharging it through said openings, and means for directing the discharged air adjacent the exterior walls of said column to control the temperature thereof.

3. In a machine tool having a column, and means dividing said column into superimposed transmission chambers, the combination with a drive shaft journaled in one of said chambers and projecting into the other chamber, of a fan attached to the projecting end of said shaft, and a turret encompassing said fan and having peripheral openings therein for directing the discharge of said fan parallel to the exterior surface of said column to produce an airfoil effect on the air stream and thus cause it to follow the contour of said column and cool the exterior walls thereof.

4. In a machine tool having a housing for enclosing a transmission mechanism, said housing having a plurality of walls, the combination of a turret formed on one of said walls, a fan rotatable under said turret, means for rotating said fan, said turret having peripheral openings for directing the discharge of said fan parallel to the supporting wall of the turret to produce an airfoil effect on the air stream and cause it to follow the contour of said column.

5. In a machine tool having a hollow column for housing transmission mechanism, said column including a plurality of vertical walls, the combination of a turret head formed centrally of one of said walls and having peripheral openings therein, a fan supported for rotation under said head, louvers formed in one of said walls forming an air intake to the interior of the column, and means for rotating said fan to effect a flow of air from said intake through the interior of said column, said fan being formed to discharge the air through said openings, and means to direct the discharged air in contact with the exterior side of said walls before dissipation to the atmosphere.

6. In a milling machine of the knee and column type having a tool spindle, a column for supporting the spindle in definite relation to the knee, said column including enclosing walls and a plurality of chambers formed therein for housing transmission mechanism, the combination of a prime mover mounted in one of said chambers, a transmission shaft mounted in the other of said chambers and projecting into the first-named chamber, a pulley mounted on the projecting end of said shaft, means operatively connecting the prime mover with the pulley for actuation thereof, passageways formed in said pulley parallel to the axis thereof, said passageways terminating in angular passageways whereby rotation of the pulley will cause expulsion of air by centrifugal force from said angular passageways, and means for directing the expelled air adjacent the exterior walls of the column for controlling the temperature thereof.

7. In a milling machine of the knee and column type having a tool spindle, a column for supporting the spindle in definite relation to the knee, said column including enclosing walls and a plurality of chambers formed therein for housing transmission mechanism, the combination of a prime mover mounted in one of said chambers, a transmission shaft mounted in the other of said chambers and projecting into the first-named chamber, a pulley mounted on the projecting end of said shaft, means operatively connecting the prime mover with the pulley for actuation thereof, a series of passageways formed in said pulley, each of said passageways having an intake opening adjacent the axis of said pulley and an exhaust opening adjacent the periphery of the pulley whereby rotation of the pulley will cause expulsion of air by centrifugal force and means for directing the expelled air adjacent the exterior walls of the column for controlling the temperature thereof.

8. A machine of the character described having a hollow upstanding column intermediately divided to provide an upper transmission chamber and a lower motor chamber, additional wall portions rearwardly of the column providing a vertical passage communicating with the motor chamber, said motor chamber having ventilation apertures formed in the walls of the forward portion thereof, a motor mounted in the motor chamber, a fan member disposed in the upper portion of the vertical passage, and driving connections between the motor and said fan member, said passage walls having discharge apertures formed therein adjacent the fan whereby air through the ventilation apertures of the motor chamber may be ejected by the fan through said passage wall apertures.

9. A machine of the character described including a hollow vertical column transversely divided to provide a lower motor compartment and an upper transmission compartment, walls on the column providing an L-shaped chamber enclosing the motor, said chamber having apertures formed therein adjacent the termini of said L-shaped chamber, a transmission drive shaft journaled in the column and projecting into one leg of the chamber, a motor mounted in the other leg of the chamber, a drive pulley carried by the motor, a second drive pulley carried by the shaft, said pulley comprising an outer belt receiving portion, an inner hub, and substantially radial webs connecting the hub and rim portions whereby said webs provide fan blades drawing air from the motor chamber by way of the space enclosed by the connecting belt.

10. A machine of the character described including a hollow vertical column transversely divided to provide a lower motor compartment and an upper transmission compartment, walls on the column providing an L-shaped chamber enclosing the motor, said chamber having apertures formed therein adjacent the termini of said L-shaped chamber, a transmission drive shaft journaled in the column and projecting into one leg of the chamber, a motor mounted in the other leg of the chamber, a drive pulley carried by the motor, a second drive pulley carried by the shaft, said pulley comprising an outer belt receiving portion, an inner hub, and substantially radial webs connecting the hub and rim portions whereby said webs provide fan blades drawing air from the motor chamber by way of the connecting belt, said pulley hub having a flared exterior portion providing with the webs outwardly directed air ejecting nozzles for the fan.

11. A machine of the character described including a hollow vertical column transversely divided to provide a lower motor compartment and an upper transmission compartment, walls on the column providing an L-shaped chamber enclosing the motor, said chamber having apertures formed therein adjacent the termini of said L-shaped chamber, a transmission drive shaft journaled in the column and projecting into one leg of the chamber, a motor mounted in the other leg of the chamber, a drive pulley carried by the motor, a second drive pulley carried by the shaft, said pulley comprising an outer belt receiving portion, an inner hub, and substantially radial webs connecting the hub and rim portions whereby said webs provide fan blades drawing air from the motor chamber by way of the space enclosed by the connecting belt, said pulley hub having a flared exterior portion providing with the webs outwardly directed air ejecting nozzles for the fan, said passage walls having deflector portions adjacent the air discharge apertures whereby the discharged air will be reversely circulated along the column walls.

MARIO E. MARTELLOTTI.